(12) United States Patent
Pedersen et al.

(10) Patent No.: US 11,546,699 B2
(45) Date of Patent: Jan. 3, 2023

(54) HEARING DEVICE WITH SERVICE MODE AND RELATED METHOD

(71) Applicant: GN HEARING A/S, Ballerup (DK)

(72) Inventors: Brian Dam Pedersen, Ringsted (DK); Allan Munk Vendelbo, Valby (DK)

(73) Assignee: GN HEARING A/S, Ballerup (DK)

( * ) Notice: Subject to any disclaimer, the term of this patent is extended or adjusted under 35 U.S.C. 154(b) by 0 days.

(21) Appl. No.: 17/344,955

(22) Filed: Jun. 11, 2021

(65) Prior Publication Data

US 2021/0306763 A1  Sep. 30, 2021

Related U.S. Application Data

(63) Continuation of application No. 16/682,791, filed on Nov. 13, 2019, now Pat. No. 11,206,496, which is a continuation of application No. 14/573,233, filed on Dec. 17, 2014, now Pat. No. 10,785,578.

(30) Foreign Application Priority Data

Dec. 12, 2014 (DK) .............. PA 2014 70778
Dec. 12, 2014 (EP) .................... 14197819

(51) Int. Cl.
*H04R 25/00* (2006.01)
*H04L 9/40* (2022.01)

(52) U.S. Cl.
CPC .......... *H04R 25/00* (2013.01); *H04L 63/123* (2013.01); *H04R 2225/55* (2013.01)

(58) Field of Classification Search
CPC .. H04R 25/00; H04R 2225/55; H04R 25/505; H04R 2225/41; H04R 25/554; H04L 63/123; H04L 9/3247; H04L 63/08; H04M 1/72478
See application file for complete search history.

(56) References Cited

U.S. PATENT DOCUMENTS

| | | |
|---|---|---|
| 5,083,312 A | 1/1992 | Newton et al. |
| 6,556,686 B1 | 4/2003 | Weidner et al. |
| 8,302,159 B2 | 10/2012 | Griesdorf et al. |

(Continued)

FOREIGN PATENT DOCUMENTS

| | | |
|---|---|---|
| CN | 102376001 A | 3/2012 |
| EP | 2804401 | 11/2014 |

(Continued)

OTHER PUBLICATIONS

Advisory Action dated Nov. 30, 2016 for related U.S. Appl. No. 14/573,233.

(Continued)

*Primary Examiner* — Angelica M McKinney
(74) *Attorney, Agent, or Firm* — Vista IP Law Group, LLP

(57) ABSTRACT

The present disclosure relates to a hearing device and in particular to hearing device and related method for configuration or operation of a hearing device. Disclosed is a hearing device comprising a processing unit configured to compensate for hearing loss of a user of the hearing device, a memory, and an interface. The processing unit/hearing device may be configured to receive a mode request via the interface; authenticate the mode request; and place the hearing device into the requested mode if authentication of the mode request succeeds.

25 Claims, 5 Drawing Sheets

(56) References Cited

U.S. PATENT DOCUMENTS

| | | | |
|---|---|---|---|
| 8,437,860 B1 | 5/2013 | Crwford et al. | |
| 8,670,355 B1* | 3/2014 | Frerking | H04R 25/554 |
| | | | 381/23.1 |
| 10,785,578 B2* | 9/2020 | Pedersen | H04L 63/123 |
| 11,206,496 B2* | 12/2021 | Pedersen | H04L 63/123 |
| 2001/0016916 A1 | 8/2001 | Mayer | |
| 2002/0054689 A1 | 5/2002 | Zhang et al. | |
| 2003/0228026 A1 | 12/2003 | Suter et al. | |
| 2004/0136555 A1* | 7/2004 | Enzmann | H04R 25/43 |
| | | | 381/314 |
| 2005/0069161 A1 | 3/2005 | Kaltenbach et al. | |
| 2005/0235354 A1 | 10/2005 | Griesdorf et al. | |
| 2007/0036373 A1 | 2/2007 | Townsend et al. | |
| 2007/0230711 A1 | 10/2007 | Hasler et al. | |
| 2008/0049957 A1 | 2/2008 | Topholm | |
| 2008/0126728 A1 | 5/2008 | Fernald | |
| 2008/0165994 A1 | 7/2008 | Caren et al. | |
| 2010/0016922 A1 | 1/2010 | Daly | |
| 2010/0205447 A1 | 8/2010 | Waldmann | |
| 2011/0126014 A1 | 5/2011 | Camp, Jr. et al. | |
| 2011/0188684 A1 | 8/2011 | Spieler et al. | |
| 2011/0280424 A1 | 11/2011 | Takagi et al. | |
| 2011/0293123 A1 | 12/2011 | Neumeyer et al. | |
| 2012/0059435 A1 | 3/2012 | Daly | |
| 2012/0140962 A1* | 6/2012 | Ubezio | H04R 25/558 |
| | | | 381/314 |
| 2014/0211972 A1 | 7/2014 | Kim et al. | |
| 2014/0241556 A1* | 8/2014 | Larsen | H04R 25/50 |
| | | | 381/316 |
| 2014/0289516 A1 | 9/2014 | Sahay | |
| 2014/0331064 A1 | 11/2014 | Ballesteros | |
| 2014/0341405 A1 | 11/2014 | Pedersen et al. | |
| 2015/0030162 A1* | 1/2015 | Luo | H04R 25/552 |
| | | | 381/23.1 |
| 2017/0318457 A1 | 11/2017 | Westermann et al. | |

FOREIGN PATENT DOCUMENTS

| | | |
|---|---|---|
| JP | 2012 2421900 A | 12/2012 |
| WO | WO 97/01314 | 1/1997 |
| WO | WO 2009/007468 A2 | 1/2009 |
| WO | WO 2015/028050 | 3/2015 |

OTHER PUBLICATIONS

Amendment Response to FOA for U.S. Appl. No. 14/573,233 dated Jun. 15, 2018.
Amendment Response to FOA for U.S. Appl. No. 14/573,233 dated Nov. 30, 2016.
Amendment Response to FOA for U.S. Appl. No. 16/682,791 dated Jun. 8, 2021.
Amendment Response to NFOA for U.S. Appl. No. 14/573,233 dated Feb. 11, 2019.
Amendment Response to NFOA for U.S. Appl. No. 14/573,233 dated Feb. 11, 2016.
Amendment Response to NFOA for U.S. Appl. No. 14/573,233 dated Nov. 14, 2017.
Amendment Response to NFOA for U.S. Appl. No. 14/573,233 dated Oct. 7, 2019.
Amendment Response to NFOA for U.S. Appl. No. 16/682,791 dated Oct. 27, 2020.
Examination Report (Article 94(3) EPC dated May 7, 2018 for related European Application No. 14197819.7, 4 pages.
Extended European Search Report dated May 14, 2020 for related European Application No. 20155342.7.
Extended European Search Report dated May 27, 2015 for related European Application No. 14197819.7, 8 pages.
Extended European Search Report dated May 5, 2020 for related European Application No. 20155342.7.
Final Office Action dated Feb. 9, 2018 for related U.S. Appl. No. 14/573,233.
Final Office Action dated May 26, 2014 for related U.S. Appl. No. 14/573,233.
Final Office Action for U.S. Appl. No. 16/682,791 dated Feb. 5, 2021.
First Office Action and Translation dated Sep. 30, 2019 for Chinese Application No. 201510924567.2.
First Technical Examination dated Jun. 29, 2015 for related Danish Patent Application No. PA 2014 70778, 6 pages.
Non-Final Office Action dated Jul. 14, 2017 for related U.S. Appl. No. 14/573,233.
Non-Final Office Action dated Jun. 15, 2018 for related U.S. Appl. No. 14/573,233.
Non-Final Office Action dated May 30, 2019 for related U.S. Appl. No. 14/573,233.
Non-Final Office Action dated Sep. 10, 2018 for related U.S. Appl. No. 14/573,233.
Non-Final Office Action dated Sep. 11, 2015 for related U.S. Appl. No. 14/573,233.
Non-Final Office Action for U.S. Appl. No. 16/682,791 dated May 27, 2020.
Notice of Allowance and fee(s) dated May 1, 2020 for related U.S. Appl. No. 14/573,233.
Notice of Allowance and fee(s) dated Nov. 1, 2019 for related U.S. Appl. No. 14/573,233.
Office Action dated Sep. 3, 2019 for Japanese Application No. JP 2015 232427.

* cited by examiner

HEARING DEVICE WITH SERVICE MODE AND RELATED METHOD

RELATED APPLICATION DATA

This application is a continuation of U.S. patent application Ser. No. 16/682,791 filed on Nov. 13, 2019, pending, which is a continuation of U.S. patent application Ser. No. 14/573,233 filed on Dec. 17, 2014, now U.S. Pat. No. 10,785,578, which claims priority to and the benefit of Danish Patent Application No. PA 2014 70778 filed on Dec. 12, 2014, and European Patent Application No. 14197819.7 filed on Dec. 12, 2014. The entire disclosures of all of the above applications are expressly incorporated by reference herein.

FIELD

The present disclosure relates to a hearing device and in particular to hearing device and related method for configuration or operation of a hearing device.

BACKGROUND

The functionality of a hearing device becomes increasingly advanced. Wireless communication between a hearing device and external devices, such as hearing device fitting apparatus, remote controllers, tablets and smart phones, has evolved. Typically, a wireless communication interface of a hearing device uses open standard-based interface. However, this poses many challenges in terms of security. A hearing device may assume any incoming data as legitimate, and may allow memory to be written or changed by an unauthorized party. Any such attacks may result in a malfunction of the hearing aid, or a battery exhaustion attack.

SUMMARY

A hearing device with reduced risk of a third party accessing any part of the hearing device may be desirable. In particular it may be desirable for a hearing device that is protected against unauthorized modification of the hearing device and operation thereof.

Disclosed is a hearing device comprising a processing unit configured to compensate for hearing loss of a user of the hearing device, a memory, and an interface. The processing unit/hearing device may be configured to receive a mode request via the interface; authenticate the mode request; and place the hearing device into the requested mode if authentication of the mode request succeeds.

Also disclosed is a method for configuration of a hearing device comprising a processing unit configured to compensate for hearing loss of a user of the hearing device, a memory, and an interface. The method may comprise receiving a mode request via the interface; authenticating the mode request; and placing the hearing device into the requested mode if authentication of the mode request succeeds.

The method and hearing device as disclosed provide secure configuration of the hearing device, such as secure access to the memory of the hearing device. It is an advantage of the present disclosure that the hearing device can only be configured or updated by authorized parties. The disclosed hearing device thus has the advantage of detecting and preventing any modification by unauthorized parties. The hearing device disclosed herein is advantageously protected against attacks such as spoofing attacks, man-in-the-middle attacks, and/or replay-attacks.

The method and apparatus as disclosed provides a secure configuration and/or update of a hearing device.

A hearing device includes: a processing unit configured to compensate for hearing loss of a user of the hearing device; a memory; and an interface; wherein the processing unit is configured to receive a request for a mode via the interface, process the request for authenticating the request, and place the hearing device into the requested mode if the processing unit succeeds in authenticating the request.

Optionally, the processing unit is configured to place the hearing device into a default mode if the processing unit fails to authenticate the request.

Optionally, when the hearing device is in the default mode, the processing unit is configured for booting the hearing device and operating the hearing device according to operating parameters set during the booting of the hearing device.

Optionally, the processing unit is configured to process the request for authenticating the request by authenticating a sender of the request.

Optionally, the processing unit is configured to process the request for authenticating the request by verifying an integrity of the request.

Optionally, the request comprises a service mode request, a fitting mode request, a debug mode request, or any combination of the foregoing.

Optionally, the processing unit is configured to place the hearing device into the requested mode by sending a mode response.

Optionally, the processing unit is configured to receive the request in a session, and wherein the processing unit is configured to terminate the session if the authentication of the request fails.

Optionally, the request comprises a signature, and wherein the processing unit is configured to process the request for authenticating the request by verifying the signature of the request.

Optionally, when the hearing device is in a service mode, the processing unit is configured to generate a session identifier, to transmit the session identifier via the interface, and to store the session identifier in the hearing device.

Optionally, when the hearing device is in a service mode, the processing unit is configured to receive data via the interface, and wherein the processing unit is configured to process the received data for authenticating the received data, and to store hearing device data in a part of the memory based on the received data if the processing unit succeeds in authenticating the received data.

Optionally, the received data comprises a session identifier, and wherein the processing unit is configured to process the received data for authenticating the received data by comparing the session identifier in the received data with a session identifier stored in the hearing device.

Optionally, the data is received in a session, and the processing unit is configured to terminate the session if the processing unit fails to authenticate the received data.

A method for configuring a hearing device having a processing unit configured to compensate for hearing loss of a user of the hearing device, a memory, and an interface, the method includes: receiving a request for a mode via the interface; processing the request for authenticating the request; and placing the hearing device into the requested mode if the act of processing the request results in a successful authentication of the request.

Optionally, the method further includes placing the hearing device into a default mode if the act of processing the request results in a failed authentication of the request.

Optionally, the act of processing the request for authenticating the request comprises authenticating a sender of the request.

Optionally, the act of processing the request for authenticating the request comprises verifying an integrity of the request.

Optionally, when the hearing device is in a service mode, the method further comprises: receiving data via the interface, processing the received data for authenticating the received data, and storing hearing device data in a part of the memory based on the received data if the act of processing the received data results in a successful authentication of the received data.

Other features and embodiments will be described below in the detailed description.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
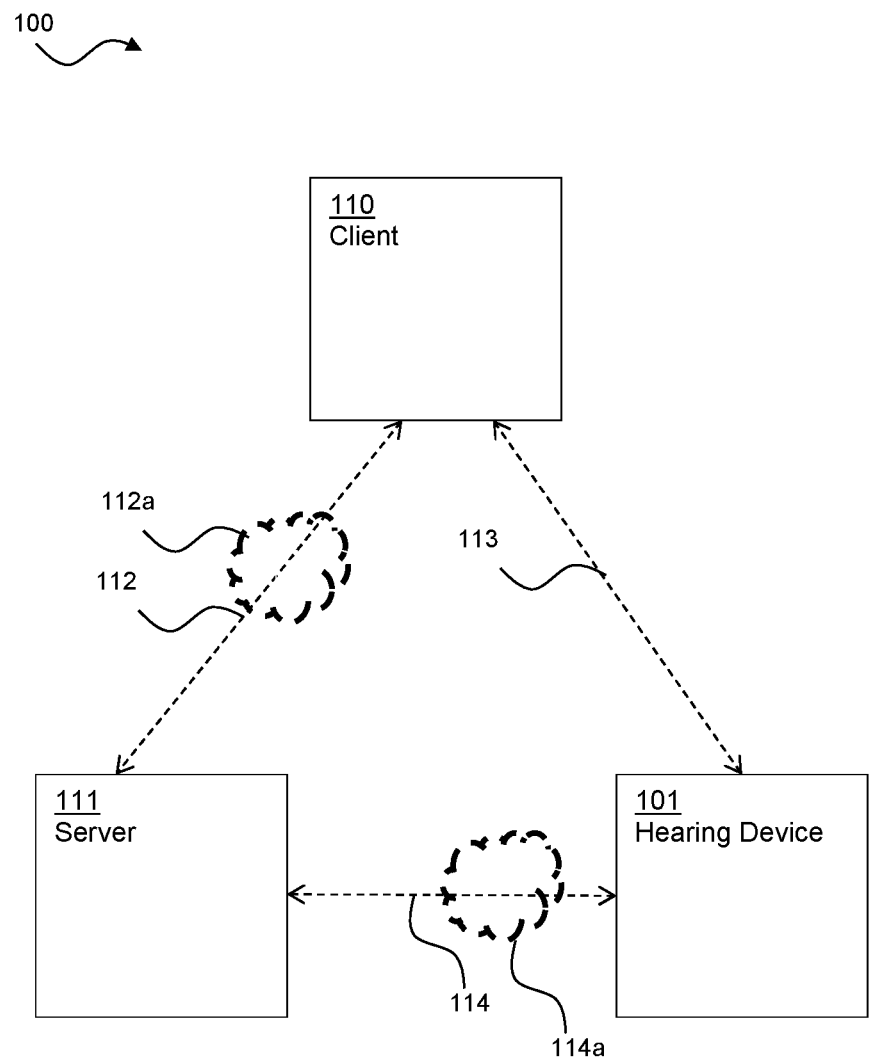
FIG. 1 schematically illustrates an exemplary architecture according to this disclosure, FIG. 2 schematically illustrates an exemplary hearing device, FIG. 3 schematically illustrates an exemplary signalling diagram, FIG. 4 schematically illustrates an exemplary signalling diagram, and FIG. 5 schematically illustrates a flowchart of an exemplary method

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

It is an object of the present disclosure to provide a hearing device, and a method which seeks to mitigate, alleviate, or eliminate one or more of the above-identified deficiencies in the art and disadvantages singly or in any combination.

The present disclosure provides improved security of a hearing device. Security comprise assessing threats, vulnerabilities and attacks and developing appropriate safeguards and countermeasures to protect against threats and attacks.

The hearing device comprises a processing unit. The processing unit is configured to compensate for hearing loss or other hearing disability of a user of the hearing device.

The hearing device may be operated in one or more modes. The one or more modes may include a first mode and/or a second mode. The one or more modes may include a third mode and/or a fourth mode. The one or more modes may include a default mode.

The first mode may be a service mode. A service mode may be characterized in that a firmware part of the memory can be written in the service mode. The firmware part of the memory may be write-protected in at least one other mode of the hearing device.

The second mode may be a fitting mode. A fitting mode may be characterized in that a fitting part of the memory can be read and/or written in the fitting mode. A fitting mode may be characterized in that a firmware part of the memory is write-protected. The fitting part of the memory may comprise fitting data, such as hearing loss parameters, compressor parameters, filter coefficients, and/or gain coefficients.

The third mode may be a debug mode. A debug mode may be characterized in that a debug part of the memory can be read and/or written in the fitting mode. A debug mode may be characterized in that a fitting part of the memory can be read and/or written in the debug mode. A debug mode may be characterized in that a firmware part of the memory can be read and/or written in the debug mode. The debug part of the memory may be read-protected and/or write-protected in at least one other mode of the hearing device, such as in the default mode and/or the fitting mode.

The default mode may be a boot mode. A boot mode may be characterized in that the hearing device is operated according to operating parameters set during booting and/or in response to user input, e.g. program selection, volume up/down, etc. The default mode may be characterized in that the firmware part (or at least a part thereof) and/or the fitting part of the memory (or at least a part thereof) is write-protected and/or read-protected in the default mode. The default mode may be characterized in that the debug part of the memory (or at least a part thereof) is read-protected and/or write-protected in the default mode.

The hearing device comprises a memory. The memory may be embedded in the processing unit and/or be employed in a memory unit connected to the processing unit. The memory may comprise a first memory part. The first memory part may be a firmware part of the memory. The firmware part of the memory may be configured to be accessed in the service mode e.g. to be written to and/or read from in the service mode. The firmware part of the memory may additionally be configured to be accessed in the debug mode. The memory may comprise a second memory part. The second memory part may be a fitting part of the memory. The fitting part of the memory may be configured to be accessed in the fitting mode e.g. to be written to and/or read from in the fitting mode. The fitting part of the memory may additionally be configured to be accessed in the service mode and/or the debug mode. The memory may comprise a third memory part. The third memory part may be a debug part of the memory. The debug part of the memory may be configured to be accessed in the debug mode e.g. to be written to or read from in the debug mode.

The hearing device may comprise an interface configured for enabling communication between the hearing device and another device. The interface may comprise a wireless transceiver, e.g. configured for wireless communication at frequencies in the range from 2.4 to 2.5 GHz. The wireless transceiver may be a Bluetooth Low Energy transceiver. The interface may comprise a connector for forming a wired connection to the hearing device. The interface may form a connection to one or more other devices such as a tablet and/or a smart phone and/or a fitting device.

The processing unit/hearing device is configured to receive a mode request via the interface. The mode request may comprise a mode identifier indicative of the requested mode. The mode request may be a service mode request, e.g. the mode identifier is indicative of a first/service mode. The mode request may be a fitting mode request, e.g. the mode identifier is indicative of a second/fitting mode. The mode request may be a debug mode request, e.g. the mode identifier is indicative of a third/debug mode. Accordingly, the mode request may be one of a service mode request, a fitting mode request, and a debug mode request.

The mode request may comprise a sender identifier indicative of the mode request sender. The mode request may comprise a certificate, such as a digital signature, for certifying the mode request sender. This allows for direct authentication of the mode request. The mode request may comprise a session identifier, e.g. an encrypted session identifier.

The hearing device may be paired with a sender of the mode request prior to receipt of the mode request. In the pairing, the hearing device and the sending/client device device may have exchanged one or more of hearing device identifier, sender identifier, session identifier, etc.

The processing unit/hearing device is configured to authenticate the mode request and to place the hearing device into the requested mode if authentication of the mode request succeeds. The processing unit may be configured to place the hearing device into a mode different from the requested mode, such as the default mode, if authentication of the mode request fails.

The hearing device disclosed herein has the advantage of verifying integrity of received mode requests and/or senders thereof, detecting any alteration and disregard altered mode requested. The hearing device disclosed herein may advantageously allow access to specific parts of the memory only with authenticated parties, such as an authenticated fitting device, an authenticated accessory device, an authenticated external device and/or an authenticated server.

The processing unit may be configured to authenticate the mode request by authenticating the sender of the mode request.

The processing unit/hearing device may be configured to authenticate the mode request by verifying integrity of a digital signature of the mode request.

The processing unit may be configured to authenticate the mode request by verifying integrity of the mode request. The mode request may comprise a message authentication code. To verify integrity of the mode request may comprise to verify the message authentication code, e.g. with a session identifier stored in the hearing device. The mode request may comprise a digital signature or certificate. To verify integrity of the mode request may comprise verifying the digital signature or certificate.

The processing unit/hearing device may be configured to send a mode response. For example, to place the hearing device into the requested mode if authentication of the mode request succeeds may comprise sending a mode response. The processing unit/hearing device may be configured to generate and/or send a mode response in response to the mode request. The processing unit may be configured to obtain and/or store a session identifier (may also be denoted session key) and include the session identifier and/or an encrypted version thereof in the mode response. To obtain the session identifier may comprise to generate the session identifier, e.g. as a random or pseudo-random number. Thus the hearing device and/or the processing unit may comprise a number generator, e.g. configured to generate a random or pseudo-random number as a session identifier. By using a unique session identifier or session identifier from a large number of available session identifiers, the processing power requirements in the hearing device may be reduced. Further, simple encryption is facilitated and replay-attacks are prevented.

The processing unit may be configured to encrypt the session identifier, optionally based on a hearing device key. The session identitier may be a session key in the form of a symmetric key. A symmetric session key may provide a lightweight processing of the security algorithms on the processing unit, such as lightweight encryption, lightweight decryption, lightweight integrity protection, etc. The hearing device key may be a symmetric key or a public key of a private-public key pair. The hearing device key may be stored in a permanent memory of the hearing device, e.g. during manufacture or during a fitting session.

The mode response may comprise the encrypted session key. The session response may comprise a hearing device identifier and/or the session key. Thus, the processing unit may be configured to send a hearing device identifier and/or the session key in the mode response. A mode response comprising a hearing device identifier may enable the sender of the mode request to obtain the hearing device key, either from a database or by requesting the hearing device key from the manufacturer, which in turn enables the sender of the mode request to decrypt an encrypted session identifier/key and use the session identifier when sending data to the hearing device.

The mode request may be received in a session. The processing unit/hearing device may be configured to terminate the session if authentication of the mode request fails.

The mode request may comprise a signature, and to authenticate the mode request may comprise to verify the signature of the mode request.

The processing unit may be configured to obtain, e.g. generate a session identifier, e.g. upon receipt of the mode request or when the hearing device is in a service mode, a fitting mode, or a debug mode. The processing unit may be configured to encrypt the session identifier, e.g. with a hearing device key. The processing unit may be configured to transmit the session identifier or the encrypted session identifier via the interface, e.g. as a part of the mode response or a session setup message. The processing unit may be configured to store the session identifier in the hearing device.

The processing unit may be configured to receive data via the interface, e.g. when the hearing device is in a mode, e.g. the service mode, the fitting mode and/or the debug mode. The processing unit may be configured to authenticate the received data, e.g. when the hearing device is in one or more modes, e.g. the service mode, the fitting mode and/or the debug mode. The processing unit may be configured to store hearing device data in a part of the memory based on the received data if authentication of the data succeeds. For example, when the hearing device is in a service mode, the processing unit may store hearing device data, such as e.g. firmware, based on the received data in the firmware part of the memory. In an exemplary hearing device, the processing unit may, when the hearing device is in a fitting mode, store hearing device data (fitting data) based on the received data in the fitting part of the memory. In an exemplary hearing device, the processing unit may, when the hearing device is in a debug mode, store hearing device data (debug data) based on the received data in the debug part of the memory.

The processing unit may be configured to authenticate the received data by verifying integrity of the received data.

Verifying integrity of the received data may be based on the session identifier stored in the hearing device. The received data may comprise a message authentication code. To verify integrity of the received data may comprise to verify the message authentication code, e.g. with the stored session identifier. The received data may comprise a digital signature. To verify integrity of the received data may comprise verifying the digital signature.

The data may comprise a session identifier, and to authenticate the data may comprise to compare the session identifier of received data with the session identifier stored in the hearing device.

The data may be received in a session. The processing unit may be configured to terminate the session if authentication of the received data fails, e.g. the processing unit may be configured to terminate the session if integrity of the received data is corrupted, i.e. verification of the integrity fails. The processing unit may be configured to place the hearing device in another mode, such as the default mode, if authentication of the received data fails, The hearing device/processing unit may be configured to receive a mode exit request and to place the hearing device in another mode, such as the default mode, e.g. if an authentication of the mode exit request succeeds. For example, a client device may send a mode exit request when fitting or transfer of firmware is done.

The disclosed method provides secure configuration and/or update of a hearing device. The method may comprise placing the hearing device into a default mode if authentication of the mode request fails. The method may comprise determining if operation in default mode fails, and switching to service mode if operating the hearing device in default mode fails, In the method, authenticating the mode request may comprise authenticating the sender of the mode request.

In the method, the mode request may comprise a digital signature, and authenticating the mode request may comprise verifying the digital signature.

In the method, authenticating the mode request may comprise verifying integrity of the mode request.

The method may comprise receiving data via the interface, e.g. when the hearing device is in one or more modes, e.g. the service mode, the fitting mode and/or the debug mode. The method may comprise authenticating the received data, e.g. when the hearing device is in one or more modes, e.g. the service mode, the fitting mode and/or the debug mode. The method may comprise storing hearing device data in a part of the memory based on the received data if authentication of the data succeeds. For example, when the hearing device is in a service mode, the method may comprise storing hearing device data (firmware) based on the received data in the firmware part of the memory. In an exemplary method, the method may, when the hearing device is in a fitting mode, comprise storing hearing device data (fitting data) based on the received data in the fitting part of the memory. In an exemplary method, the method may, when the hearing device is in a debug mode, comprise storing hearing device data (debug data) based on the received data in the debug part of the memory. The method may comprise placing the hearing device in another mode, such as the default mode, if authenticating the received data fails.

The processing unit may be configured to operate the hearing device in default mode, and switch to service mode if operating the hearing device in default mode fails, FIG. 1 schematically illustrates an exemplary architecture 100 according to this disclosure. The architecture 100 comprises a hearing device 101, a client device 110, and a server device 111. The client device 110 may comprise a computing device acting as a client, a fitting device, a handheld device, a relay, a tablet, a personal computer, a mobile phone, and/or USB dongle plugged into a personal computer. The server device 111 may comprise a computing device configured to act as a server, i.e. to serve requests from the client device 110 and/or from the hearing device 101. The server device 111 may be controlled by the hearing device manufacturer.

The hearing device 101 may be connected to the client device 110 via a communication link 113, such as a bidirectional communication link and/or a wireless communication link. The wireless communication link may be carried over a short-range communication system, such as Bluetooth, Bluetooth low energy, IEEE 802.11, Zigbee. The hearing device 101 may be connected to the client device 110 over a network.

The hearing device 101 may be connected to the server device 111 via a communication link 114 over a network 114a, such as a bidirectional and/or wireless communication link over a network.

The client device 110 may be connected to the server device 111 via a communication link 112 over a network 112a, such as a bidirectional and/or wireless communication link over a network. In an embodiment, the network 112a may be the Internet.

Figure 2:
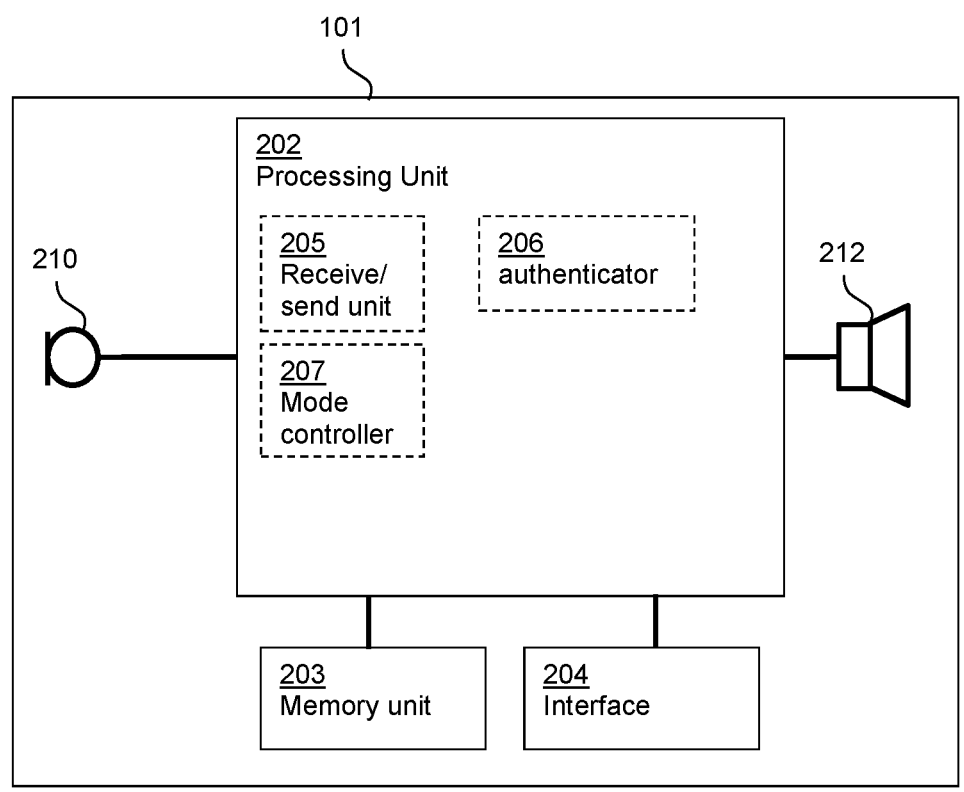

FIG. 2 schematically illustrates an exemplary hearing device 101. The exemplary hearing device 101 comprises a processing unit 202 configured to compensate for hearing loss of a user of the hearing device 101. The exemplary hearing device 101 comprises a memory and an interface 204. The memory is in FIG. 1 illustrated in the form of a memory unit 203 external to the processing unit 202. The memory may in other exemplary hearing devices be at least partly embedded in the processing unit 202 and/or in the memory unit 203.

The processing unit 202 is configured to receive a mode request via the interface 204. Hence, the processing unit 202 comprises a receive/send unit 205 configured to send and/or receive via the interface 204. The receive/send unit 205 is configured to send and receive via the interface 204 to/from an external device, such as a server device, a client device, a fitting device, an accessory, a relay device, a smart phone. The processing unit 202 is configured to authenticate the received mode request. Hence, the processing unit 202 may comprise an authenticator 206 configured to authenticate the mode request. The processing unit 202 is configured to place the hearing device into the requested mode, such as a service mode, a fitting mode or debug mode, if authentication of the mode request succeeds. Hence the processing unit 202 comprises a mode controller configured to place the hearing device into the requested mode, e.g. based on an output from the authenticator 206. In the hearing aid in FIG. 2, the processing unit 202 is configured to place the hearing device into a default mode if authentication of the mode request fails, the default mode comprising booting the hearing device and operating the hearing device according to operating parameters set during booting. In an embodiment, the operating parameters set during booting may be stored in a non-volatile part of the memory unit 203. In an embodiment, the operating parameters set during booting may comprise a default setting enabling the hearing aid to function according to a default setting programmed during production of the hearing device.

The hearing device comprises a microphone 210 for receiving a sound signal and converting it into converted sound signal. The converted sound signal may be an electrical and digital version of the sound signal. The processing unit is configured to receive and process the converted sound signal into a processed sound signal according to a hearing loss of a user of the hearing device. The processed sound signal may be compressed and/or amplified or the like. The hearing device further comprises an output transducer/loudspeaker, known as a receiver 212. The receiver 212 is configured to receive the processed sound signal and convert it to an output sound signal for reception by an eardrum of the user.

Figure 3:
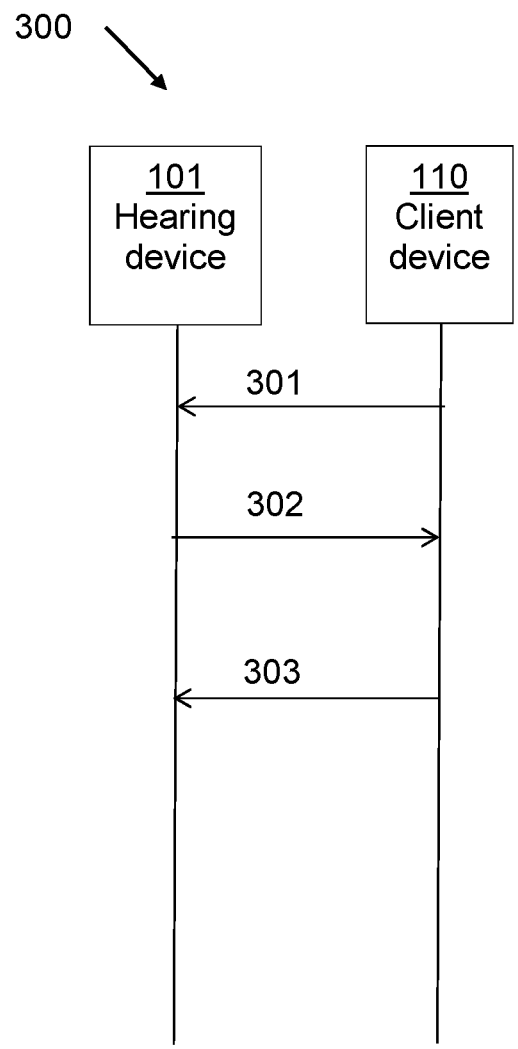

FIG. 3 shows an exemplary signalling diagram 300 between a hearing device 101, and a client device 110. In an embodiment, the client device may be in the form of a fitting device. The hearing device 101 receives a fitting mode request 301 via the interface 204 from the client device 110, the mode request comprising a digital signature and a mode identifier. The digital signature may be a signature according to the Digital Signature Standard or other suitable standards, such as RSA. for digital signatures known in the art. The hearing device 101 authenticates the mode request by verifying the digital signature. In the illustrated signalling diagram 300, the authentication succeeds, and the processing unit places the hearing device in the fitting mode including sending a fitting mode response 302 to the client device via the interface 204. In the fitting mode of hearing device 101, a firmware part of the memory is write-protected and a fitting mode part of the memory is write-enabled.

Upon receipt of the fitting mode response 302, the client device 110 sends data 303 to the hearing device 101 which receives the data and authenticates the received data 303, e.g. by use of digital signature or a session identifier/key as described earlier. If authentication of data 303 succeeds, the processing unit 202 derives hearing device data (fitting data) from the data 303 and stores hearing device data (fitting data) in a fitting part of the memory. If authentication of data 303 fails, the processing unit 202 places the hearing device in default mode.

When the fitting data have been transferred, the client device may send a mode exit request and the hearing device is configured to optionally authenticate the mode exit request and to place the hearing device in the default mode, optionally if authentication of the mode exit request succeeds.

In another embodiment, the client device may be in the form of a smart phone or a tablet and may comprise software configured to provide the functionality of a fitting device.

Figure 4:
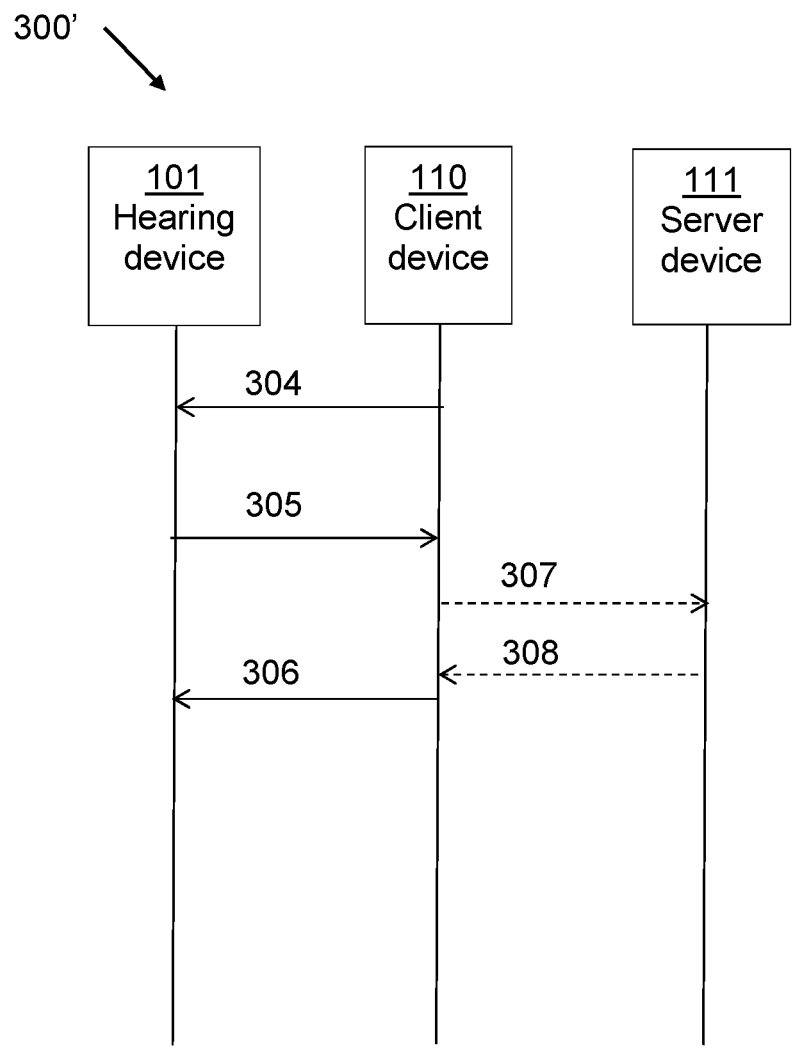

FIG. 4 shows an exemplary signalling diagram 300' where a client device 110 is used for updating firmware of the hearing device 101, and a client device 110 in the form of a fitting device. The hearing device 101 receives a service mode request 304 via the interface 204 from the client device 110. The hearing device 101 authenticates the service mode request. In the illustrated signalling diagram 300', the authentication succeeds, and the processing unit 202 places the hearing device in the service mode including sending a service mode response 305 to the client device via the interface 204. In the service mode of hearing device 101, the processing unit 202 is allowed to write to a firmware part of the memory.

Upon receipt of the service mode response 305, the client device 110 sends data 306 to the hearing device 101 which receives the data and authenticates the received data 306, e.g. by use of digital signature or a session identifier/key as described earlier. Before sending data to the hearing device, the client device 110 may correspond with a server device 111 as illustrated with dotted arrows 307, 308, e.g. in order to determine the data 306 to be sent to the hearing device.

If authentication of data 306 succeeds, the processing unit 202 derives hearing device data (firmware data) from the data 306 and stores hearing device data (firmware data) in a firmware part of the memory. If authentication of data 306 fails, the processing unit 202 may place the hearing device in default mode and/or terminate the session.

When the firmware has been transferred, the client device may send a mode exit request and the hearing device is configured to optionally authenticate the mode exit request and place the hearing device in the default mode, optionally if authentication of the mode exit request succeeds.

Figure 5:
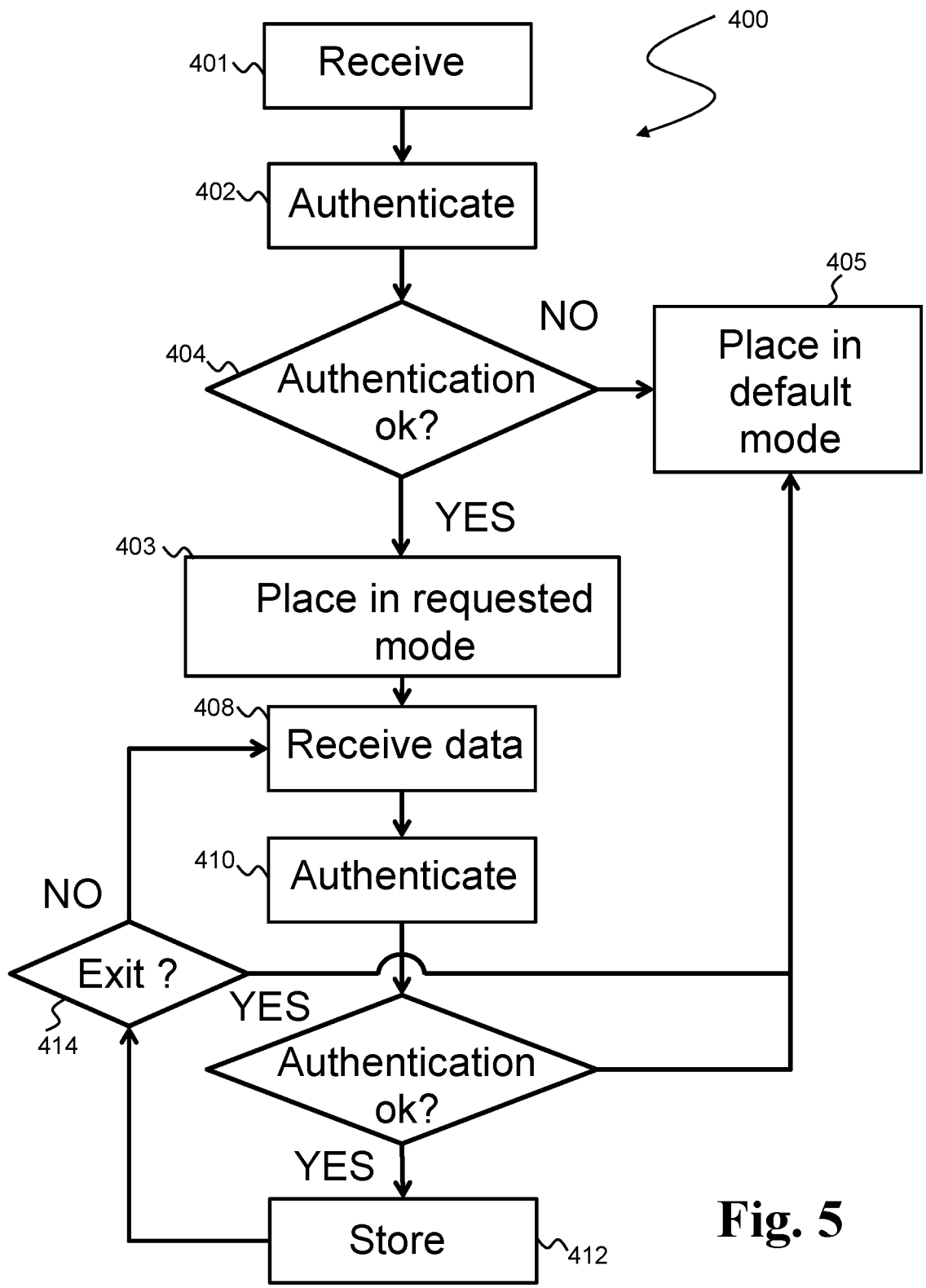

FIG. 5 illustrates an exemplary flowchart of a method 400, e.g. for configuration of a hearing device, such as hearing device 101, comprising a processing unit configured to compensate for hearing loss of a user of the hearing device, a memory, and an interface. The method 400 comprises receiving 401 a mode request via the interface and authenticating 402 the mode request. Authenticating 402 the mode request comprises authenticating the sender of the mode request and verifying integrity of the mode request. If authentication of the mode request succeeds 404, the method proceeds to placing 403 the hearing device into the requested mode. If authentication of the mode request fails 404, the method optionally proceeds to placing 405 the hearing device into a default mode. After placing the hearing device in the requested mode, the method optionally proceeds to receiving 408 data via the interface, authenticating 410 the received data; and storing 412 hearing device data in a part of the memory corresponding to the requested mode and based on the received data if authentication of the data succeeds. If authenticating 410 the received data fails, the method may proceed to placing 405 the hearing device in default mode or another mode and/or terminating the session. Upon storing, the method 400 optionally comprises to evaluate 414 whether a mode exit request has been received. If so, the method proceeds to placing 405 the hearing device in default mode. If not, the method proceeds to receiving 408 data.

The use of the terms "first", "second", "third" and "fourth", etc. does not imply any particular order, but are included to identify individual elements. Moreover, the use of the terms first, second, etc. does not denote any order or importance, but rather the terms first, second, etc. are used to distinguish one element from another. Note that the words first and second are used here and elsewhere for labelling purposes only and are not intended to denote any specific spatial or temporal ordering. Furthermore, the labelling of a first element does not imply the presence of a second element and vice versa.

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

LIST OF REFERENCES 100 architecture
101 hearing device
111 server device
202 processing unit
203 memory unit
204 interface 205 receive/send unit
206 authenticator
207 mode controller
210 microphone
212 receiver
300, 300' signalling diagram
301 fitting mode request
302 fitting mode response
303 data
304 service mode request
305 service mode response
306 data
307 firmware request
308 firmware response
400 method for configuration of a hearing device
401 receiving mode request
402 authenticating mode request
403 placing hearing device in requested mode
404 authentication ok?
405 placing hearing device in default mode
408 receiving data via the interface
410 authenticating the received data
412 storing hearing device data
414 evaluating if mode exit request has been received

The invention claimed is:

1. A hearing device comprising:
a processing unit configured to process audio signals for a user of the hearing device;
a memory; and
an interface;
wherein the processing unit is configured to
receive a communication from an external device via the interface, wherein the external device is located away from a head of the user,
process the communication to perform an authentication, and
place the hearing device into a mode if the authentication is successful;
wherein the mode comprises a service mode, and wherein when the hearing device is in the service mode, the processing unit is configured to generate a session identifier.

2. The hearing device according to claim 1, wherein the processing unit is configured to place the hearing device into a default mode if the authentication fails.

3. The hearing device according to claim 2, wherein when the hearing device is in the default mode, the processing unit is configured for booting the hearing device and operating the hearing device according to operating parameters set during the booting of the hearing device.

4. The hearing device according to claim 1, wherein the processing unit is configured to perform the authentication to authenticate the external device.

5. The hearing device according to claim 1, wherein the processing unit is configured to perform the authentication to verify an integrity of the communication.

6. The hearing device according to claim 1, wherein the communication comprises a service mode request, a fitting mode request, a debug mode request, or any combination of the foregoing.

7. The hearing device according to claim 1, wherein the processing unit is configured to place the hearing device into the mode by sending a mode response.

8. The hearing device according to claim 1, wherein the processing unit is configured to receive the communication in a session, and wherein the processing unit is configured to terminate the session if the authentication fails.

9. The hearing device according to claim 1, wherein the communication comprises a signature, and wherein the processing unit is configured to process the communication to verify the signature.

10. The hearing device according to claim 1, wherein the processing unit is configured to compare the session identifier with another session identifier.

11. The hearing device according to claim 1, wherein the processing unit is configured to terminate a session if the processing unit fails to authenticate the received data.

12. A hearing device comprising:
a processing unit configured to process audio signals for a user of the hearing device;
a memory; and
an interface;
wherein the processing unit is configured to
receive a communication from an external device via the interface, wherein the external device is located away from a head of the user,
process the communication to perform an authentication, and
place the hearing device into a mode if the authentication is successful;
wherein when the hearing device is in the mode, the processing unit is configured to receive data via the interface, wherein the processing unit is configured to process the received data, and wherein the hearing device is configured to store hearing device data in a part of the memory.

13. The hearing device according to claim 12, wherein the processing unit is configured to place the hearing device into a default mode if the authentication fails.

14. The hearing device according to claim 13, wherein when the hearing device is in the default mode, the processing unit is configured for booting the hearing device and operating the hearing device according to operating parameters set during the booting of the hearing device.

15. The hearing device according to claim 12, wherein the processing unit is configured to perform the authentication to authenticate the external device.

16. The hearing device according to claim 12, wherein the processing unit is configured to perform the authentication to verify an integrity of the communication.

17. The hearing device according to claim 12, wherein the communication comprises a service mode request, a fitting mode request, a debug mode request, or any combination of the foregoing.

18. The hearing device according to claim 12, wherein the processing unit is configured to place the hearing device into the mode by sending a mode response.

19. The hearing device according to claim 12, wherein the processing unit is configured to receive the communication in a session, and wherein the processing unit is configured to terminate the session if the authentication fails.

20. The hearing device according to claim 12, wherein the communication comprises a signature, and wherein the processing unit is configured to process the communication to verify the signature.

21. The hearing device according to claim 12, wherein the processing unit is configured to compare a session identifier with another session identifier.

22. A method performed by a hearing device having a processing unit configured to process audio signals for a user of the hearing device, a memory, and an interface, the method comprising:

receiving a communication from an external device via the interface, wherein the external device is located away from a head of the user;

processing the communication to perform an authentication;

placing the hearing device into a mode if the authentication is successful;

receiving data via the interface;

processing the received data; and storing hearing device data in a part of the memory.

23. The method according to claim 22, further comprising placing the hearing device into a default mode if the authentication fails.

24. The method according to claim 22, wherein the act of processing the communication is performed to authenticate the external device.

25. The method according to claim 22, wherein the act of processing the communication is performed to verify an integrity of the communication.

* * * * *